(12) United States Patent
Endo et al.

(10) Patent No.: US 10,282,139 B2
(45) Date of Patent: May 7, 2019

(54) PROCESSING METHOD, PROCESSING SYSTEM, AND STORAGE MEDIUM

(71) Applicant: Panasonic Intellectual Property Management Co., Ltd., Osaka (JP)

(72) Inventors: Mitsuru Endo, Tokyo (JP); Viviane Takahashi, Kanagawa (JP); Hongjie Shi, Tokyo (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 115 days.

(21) Appl. No.: 15/613,486

(22) Filed: Jun. 5, 2017

(65) Prior Publication Data

US 2017/0364310 A1    Dec. 21, 2017

(30) Foreign Application Priority Data

Jun. 16, 2016    (JP) ................................. 2016-120091

(51) Int. Cl.

| G06F 3/16 | (2006.01) |
|---|---|
| G10L 15/22 | (2006.01) |
| G06F 3/06 | (2006.01) |
| G06F 16/18 | (2019.01) |
| G06F 17/27 | (2006.01) |

(Continued)

(52) U.S. Cl.
CPC ............ *G06F 3/0685* (2013.01); *G06F 3/167* (2013.01); *G06F 16/1858* (2019.01); *G06F 17/2705* (2013.01); *G06F 17/2785* (2013.01); *G06Q 50/00* (2013.01); *G10L 17/26* (2013.01);

(Continued)

(58) Field of Classification Search
CPC .............. G10L 15/22; G10L 2015/221; G10L 2015/225; G06F 3/167
See application file for complete search history.

(56) References Cited

U.S. PATENT DOCUMENTS

| 4,868,763 A | * | 9/1989 | Masui ................... G06N 5/043 706/10 |
|---|---|---|---|
| 5,893,910 A | * | 4/1999 | Martineau ........... G06F 21/6209 |

(Continued)

FOREIGN PATENT DOCUMENTS

JP    62-276627    12/1987

*Primary Examiner* — Samuel G Neway
(74) *Attorney, Agent, or Firm* — Greenblum & Bernstein, P.L.C.

(57) ABSTRACT

A processing method executed by a processor that receives an order from a user at a restaurant through interaction includes analyzing information indicating the order, extracting a phrase other than a standard element from the information, with reference to a first database when the extracted phrase is a first phrase in the first database, outputting a first confirmation item corresponding to the first phrase to the user, receiving a first user response corresponding to the first confirmation item, when the extracted phrase is not a first phrase in the first database, referring to a second database, when the extracted phrase is a second phrase in the second database, selecting a third phrase in the first database from second phrase-related phrases, outputting a second confirmation item corresponding to the third phrase to the user referring to the first database, and receiving a second user response corresponding to the second confirmation item.

7 Claims, 10 Drawing Sheets

(51) Int. Cl.
   *G10L 17/26*   (2013.01)
   *G06Q 50/00*   (2012.01)
(52) U.S. Cl.
   CPC ........ *G10L 15/22* (2013.01); *G10L 2015/221* (2013.01); *G10L 2015/225* (2013.01)

(56) References Cited

U.S. PATENT DOCUMENTS

| | | | |
|---|---|---|---|
| 6,314,398 B1 * | 11/2001 | Junqua | G10L 15/1822 348/E5.105 |
| 6,341,268 B2 * | 1/2002 | Walker | G06Q 10/087 705/15 |
| 7,587,322 B2 * | 9/2009 | Schimmer | G10L 15/1822 704/257 |
| 7,653,541 B2 * | 1/2010 | Ogawa | G10L 15/06 704/231 |
| 9,105,041 B2 * | 8/2015 | Harman | G06Q 30/06 |
| 9,495,331 B2 * | 11/2016 | Govrin | G06Q 40/02 |
| 9,756,185 B1 * | 9/2017 | Madden, Jr. | H04M 3/5175 |
| 2002/0049598 A1 * | 4/2002 | Negreiro | G06K 17/00 704/275 |
| 2004/0044516 A1 * | 3/2004 | Kennewick | G10L 15/22 704/5 |
| 2016/0293162 A1 * | 10/2016 | Takahashi | G06F 17/2785 |
| 2017/0364310 A1 * | 12/2017 | Endo | G06F 3/0685 |

* cited by examiner

PROCESSING METHOD, PROCESSING SYSTEM, AND STORAGE MEDIUM

BACKGROUND

1. Technical Field

The present disclosure relates to an interaction processing method and system that generate a response sentence in response to a received speech or text, and a non-transitory storage medium storing a program for executing the processing method.

2. Description of the Related Art

There has been disclosed a knowledge base system that responds to a request from the user using knowledge bases. This knowledge base system includes multiple knowledge processors that include their own knowledge bases. If one knowledge processor has difficulty in meeting a request from the user using its own knowledge base, this knowledge processor requests another knowledge processor to meet the request. Thus, this knowledge base system can meet the user's request.

For example, see Japanese Unexamined Patent Application Publication No. 62-276627.

SUMMARY

However, the above conventional technology needs to be further improved.

In one general aspect, the techniques disclosed here feature a processing method executed by a processor that automatically receives an order from a user at a restaurant through an interaction with the user. The processing method includes analyzing specific order information indicating the order of the user inputted through a microphone connected to the processor or a keyboard connected to the processor or a touchscreen connected to the processor, extracting, from the specific order information, a phrase other than a standard element commonly used in orders at the restaurant, with reference to a first database in which multiple phrases and multiple confirmation items with respect to orders are associated with each other when it is determined that the extracted phrase is a first phrase included in the first database, outputting first confirmation information indicating a first confirmation item corresponding to the first phrase to the user through a speaker connected to the processor or a display connected to the processor, the phrase including a noun and a noun phrase, receiving first response information indicating a first response from the user corresponding to the first confirmation item through the microphone or the keyboard or the touchscreen, when it is determined that the extracted phrase is not included in the first database, with reference to the first database, referring to a second database in which multiple phrases and one or more phrases related to the phrases are associated with each other, the phrases and the related one or more phrases included in the second database including a noun, a noun phrase, an adjective, and an adjective phrase, when it is determined that the extracted phrase is a second phrase included in the second database, selecting a third phrase included in the first database from among one or more phrases related to the second phrase, the third phrase number including a noun and a noun phrase, outputting second confirmation information indicating a second confirmation item corresponding to the third phrase to the user through the speaker or the display with reference to the first database, receiving second response information indicating a second response from the user corresponding to the second confirmation item through the microphone or the keyboard or the touchscreen, and continuing a process of receiving the order of the user.

According to the interaction processing method and system and non-transitory storage medium storing a program for executing the processing method of the present disclosure, the response ability is improved.

It should be noted that general or specific embodiments may be realized as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Underlying Knowledge Forming Basis of the Present Disclosure

The takeover of work by artificial intelligence has been considered in recent years. In various types of work, particularly in interpersonal work such as service, artificial intelligence needs to respond to a request from a customer through oral communication with the customer. For this reason, a task execution-type interaction technology is being considered.

Figure 1A:
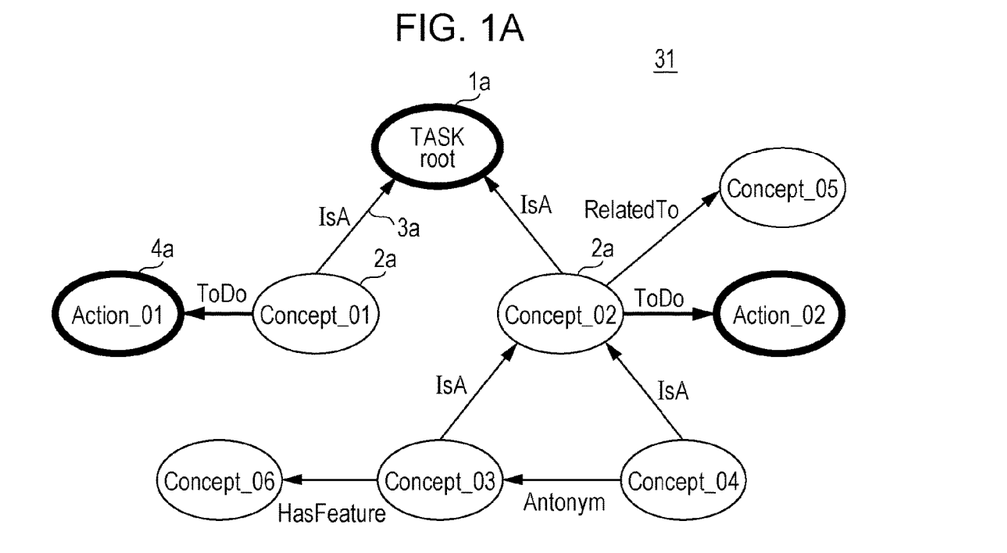
FIG. 1A is a diagram showing an example of a task knowledge base.
Figure 1B:
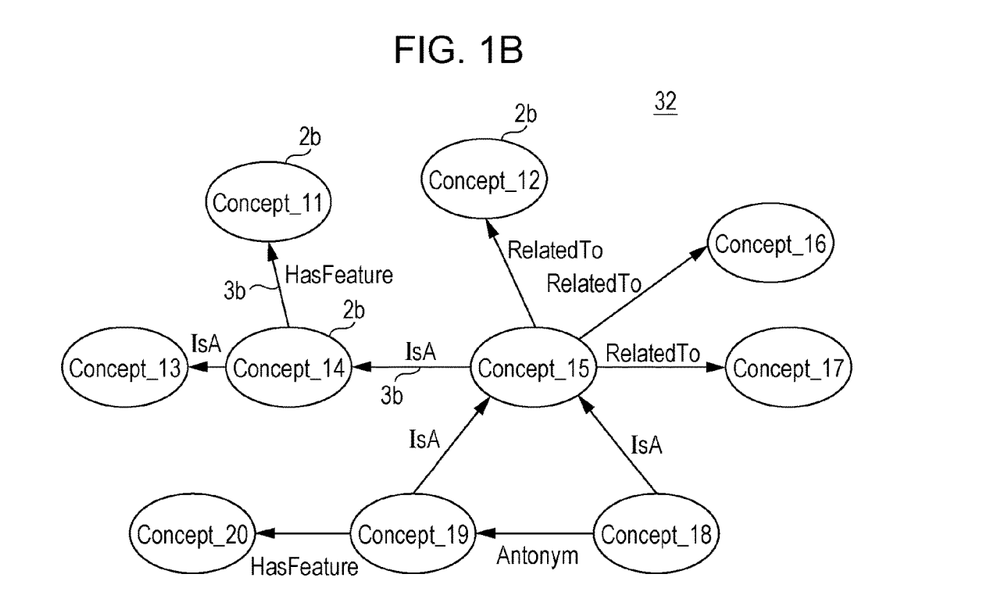
FIG. 1B is a diagram showing an example of a general knowledge base.

FIG. 1A shows an example of a task knowledge base. This task knowledge base is a knowledge base including knowledge related to the execution of tasks. FIG. 1B shows an example of a general knowledge base. This general knowledge base is a knowledge base including general knowledge.

Terms in the description below are defined as follows.

"Concept": a word included in natural language or a phrase formed by two or more words.

"Action": an action related to the execution of a task.

"Node": represents a concept or action in a knowledge base (shown by an ellipse in FIGS. 1A, 1B).

"Root": the most superordinate concept in a knowledge base.

"Edge": associate nodes with each other in a knowledge base using a relative (shown by an arrow in FIGS. 1A, 1B).

"Relative": represents the relationship between nodes ("IsA," "HasFeature," "Antonym," "RelatedTo," "ToDo" in FIGS. 1A, 1B).

"Knowledge": include concepts, actions, concept-concept relationships, and concept-action relationships.

In the present disclosure, the term "the execution of a task" refers to doing work corresponding to an instruction of a user. For example, the execution of a task is to receive an order in a state in which cups of coffee can actually be provided.

In the present disclosure, the relatives have the following meanings. Relative "IsA": represents the hierarchical relationship between concepts and, specifically, indicates that a connection-source node is a subordinate concept of a connection-destination node. For example, FIG. 1A indicates that a node 2a "Concept_01" is a subordinate concept of a root node 1a "TASK root."

"Relative "HasFeature": indicates that a node has a feature (property) and, specifically, indicates that a connection-source node has a connection-destination node as a feature. Relative "RelatedTo": indicates that there is a relationship between a connection-source concept and a connection-destination concept.

Relative "Antonym": indicates that a connection-source concept and a connection-destination concept are antonyms. Relative "ToDo": associates a connection-source node 2a with an action node 4a and indicates that the node 2a should do an action shown by the connection-destination action node 4a. Specifically, for example, FIG. 1A indicates that a node 2a "Concept_01" should do "Action_01" shown by the action node 4a.

As shown in FIGS. 1A and 1B, a task knowledge base 31 and a general knowledge base 32 are directed graphs in which multiple concepts are associated with each other by relatives.

The task knowledge base 31 is generated on the basis of knowledge related to the execution of tasks and includes knowledge related to the execution of the tasks. As shown in FIG. 1A, the task knowledge base 31 includes the root node 1a "TASK root" and nodes 2a which are subordinate nodes thereof and which represent concepts. The nodes 2a are connected by edges 3a represented by the relatives "IsA," "RelatedTo," and "HasFeature," and the like. The task knowledge base 31 also includes action nodes 4a "Action_01" and "Action_02" that represent actions. The action nodes 4a are connected to the nodes 2a, which represent concepts, by relatives "ToDo." The task knowledge base 31 thus configured is generated on the basis of an assumption of the describer of the task knowledge base 31. However, users make a variety of requests, and it is difficult to previously predict all requests and to generate a task knowledge base 31 including all knowledge required to execute tasks. Also, in order to generate an accurate task knowledge base 31 so that tasks are reliably executed, the task knowledge base 31 is required to have quality. For this reason, a task knowledge base 31 is often manually constructed, and the amount of knowledge of the task knowledge base 31 is limited. Accordingly, the task knowledge base 31 has difficulty in covering all concepts. As a result, it may be difficult to interpret requests of users using only the task knowledge base 31.

On the other hand, the general knowledge base 32 as shown in FIG. 1B is constructed mechanically from corpuses (a great amount of language data) and includes general knowledge. Typically, the general knowledge base 32 includes a large amount of information about the hierarchical relationships between concepts (e.g., represented by relatives "IsA") and a large amount of information about the properties of concepts (e.g., represented by relatives "HasFeature"). The general knowledge base 32 does not include action nodes 4a related to the execution of tasks as included in the task knowledge base 31. Accordingly, it is difficult to execute tasks requested by users using only the general knowledge base 32. While a large-size knowledge base can be constructed using a mechanical construction method, concepts are not accurately associated with each other in such a knowledge base in many cases. Accordingly, it is difficult to execute tasks requested by users using such a knowledge base.

As seen above, the manually constructed small-size task knowledge base 31 does not cover a wide range of concepts, whereas the mechanically automatically constructed large-size general knowledge base 32 has difficulty in achieving tasks. Accordingly, it is difficult to execute tasks with high response ability using only the task knowledge base 31 or using only the general knowledge base 32.

In view of the foregoing, an interaction processing system of the present disclosure is configured to be able to execute tasks with high response ability using both the task knowledge base 31, which includes knowledge related to the execution of tasks, and the general knowledge base 32, which covers a wide range of knowledge.

EMBODIMENT

1. Configuration of Interaction Processing System

Figure 2:
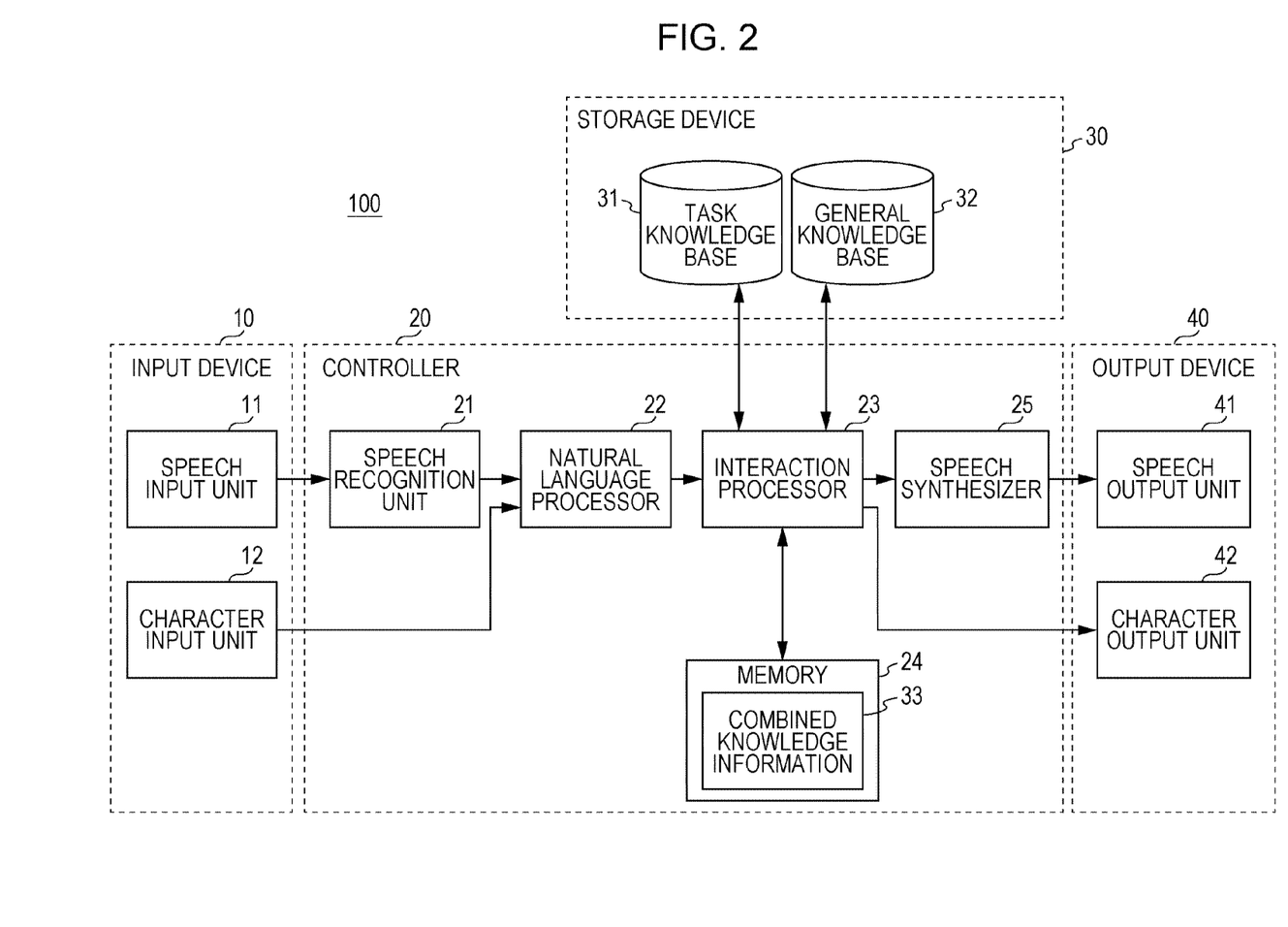
FIG. 2 is a block diagram showing the configuration of an interaction processing system of one aspect of the present disclosure.

FIG. 2 shows the configuration of an interaction processing system of one aspect of the present disclosure. An interaction processing system 100 of the present disclosure includes an input unit 10 that receives a speech or text of the user, a controller 20 that generates a response sentence in response to the received speech or text, a storage unit 30 that stores a task knowledge base 31 and a general knowledge base 32, and an output unit 40 that outputs the generated response sentence in the form of a speech or text.

The input unit 10 includes a speech input unit 11 that receives a speech made by the user and a character input unit 12 that receives text. The speech input unit 11 is, for example, a microphone. The character input unit 12 is, for example, a keyboard or touchscreen.

The controller 20 includes a speech recognition unit 21 that converts a speech received by the speech input unit 11 into text (text data) and a natural language processor 22 that processes text (input sentence) outputted from the speech recognition unit 21 and character input unit 12. The natural language processor 22 analyzes the syntax of the text and extracts concepts in natural language from the syntax. The natural language processor 22 uses, for example, a general semantic parser that converts the surface representation of a sentence into a semantic representation. A semantic representation consists of, for example, a verb phrase indicating the intent of the user and an object phrase related to the verb phrase. Particularly, in the present embodiment, a semantic representation is used as concepts obtained by extracting nouns or adjectives included in an object phrase.

The controller 20 further includes an interaction processor 23 that generates combined knowledge information 33 with reference to the task knowledge base 31 and general knowledge base 32 on the basis of the extracted concepts and generates a response sentence corresponding to the input sentence, a memory 24 that stores the generated combined knowledge information 33, and a speech synthesizer 25 that converts the generated response sentence in text (text data) into a speech (speech signal) by speech synthesis. A response sentence can be generated using a typical method such as the use of a template for sentence generation.

The speech recognition unit 21, natural language processor 22, interaction processor 23, and speech synthesizer 25 can be realized by a semiconductor device or the like. These functions may be realized by only hardware or may be realized by a combination of hardware and software. For example, these functions may be realized by a microcomputer, CPU, MPU, DSP, FPGA, or ASIC. The memory 24 can be realized by, for example, RAM, DRAM, ROM, ferroelectric memory, flash memory, magnetic disk, or a combination thereof.

The controller 20 is, for example, a server that realizes the functions of the elements thereof (the speech recognition unit 21, natural language processor 22, interaction processor 23, and speech synthesizer 25) in accordance with a program. For example, the controller 20 stores, in the memory 24, a program for realizing the functions of the elements, and a CPU realizes the functions of the elements by copying the program stored in the memory 24 to the RAM and sequentially reading commands included in the program from the RAM and executing the commands. When executing the program, information obtained in processes described in the present embodiment is stored in the RAM or memory 24 and used as necessary. The controller 20 may include, for example, an interface circuit for communicating with an external device in accordance with a predetermined communication standard (e.g., LAN, WiFi) so that it can communicate with the external device.

The task knowledge base 31 is a knowledge base where multiple concepts are associated with each other by relatives and which includes information about knowledge (actions, etc.) related to the execution of tasks, as shown in FIG. 1A. The general knowledge base 32 is a knowledge base where multiple concepts are associated with each other by relatives and which includes information about general knowledge (hierarchical relationships, properties, or the like), as shown in FIG. 1B. For example, the storage unit 30 may be present on the cloud and connected to the controller 20 through the Internet, or may be included in the controller 20. The task knowledge base 31 and general knowledge base 32 may be stored in different storage devices. The task knowledge base 31 and general knowledge base 32 may also be present on the cloud or stored in the controller 20 in accordance with the sizes thereof. The storage unit 30 can be realized by, for example, SSD, ROM, DRAM, ferroelectric memory, flash memory, magnetic disk, or the like.

The output unit 40 includes a speech output unit 41 that outputs a speech and a character output unit 42 that outputs text. The speech output unit 41 is, for example, a speaker. The character output unit 42 is, for example, a liquid crystal display.

The controller 20 may be wirelessly connected to the input unit 10, storage unit 30, and output unit 40, or may be wire-connected thereto through a connector, cable, or the like.

2. Interaction Process

Figure 3:
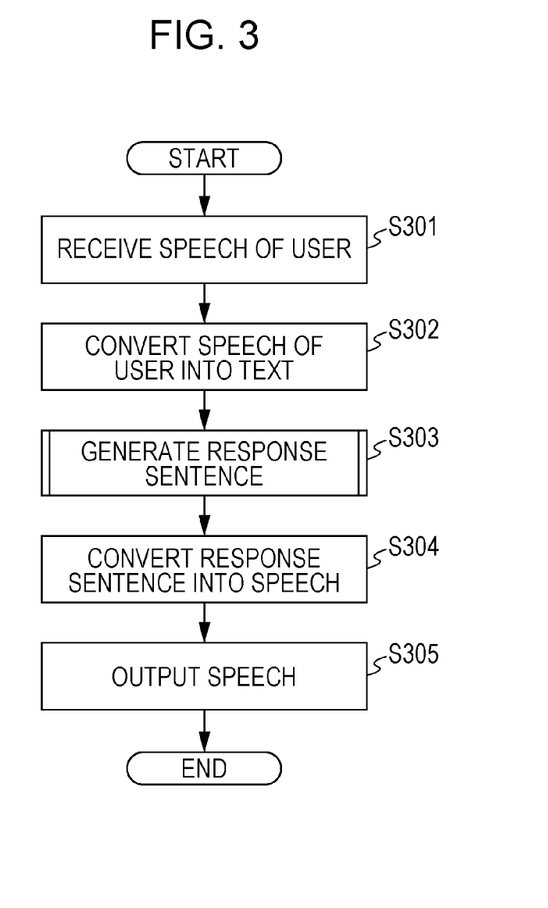
FIG. 3 is a flowchart schematically showing an interaction process of an embodiment of the present disclosure.

FIG. 3 shows the overall flow of an interaction process performed by the controller 20. FIG. 3 shows an example in which the controller 20 interacts with the user through a speech. When the speech input unit 11 receives a speech of the user (S301), the controller 20 causes the speech recognition unit 21 to convert the speech of the user into text (S302). The controller 20 then causes the natural language processor 22 to extract natural-language concepts from the text. The controller 20 then causes the interaction processor 23 to generate a response sentence using the task knowledge base 31 or using both the task knowledge base 31 and general knowledge base 32 on the basis of the extracted concepts (S303). The controller 20 then causes the speech synthesizer 25 to convert the response sentence in text into a speech (S304) and causes the speech output unit 41 to output the speech corresponding to the response sentence (S305). Note that if the controller 20 interacts with the user through text, it causes the character input unit 12 to receive text in step S301, skips the speech-to-text conversion process (S302) and the text-to-speech conversion process (S304), and causes the character output unit 42 to output a response sentence in text in step S305.

Figure 4:
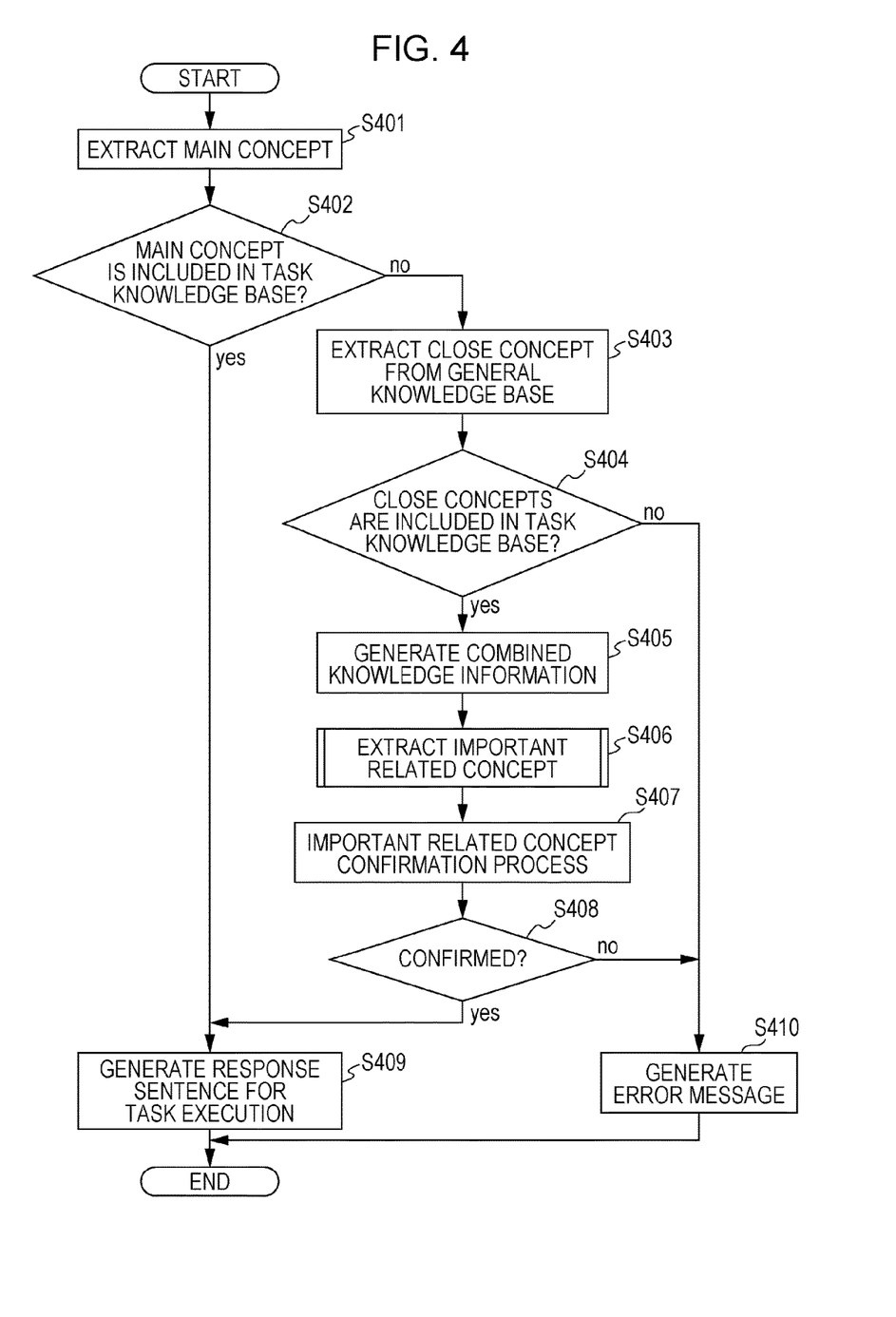
FIG. 4 is a flowchart showing details of a process in step S303 of FIG. 3.
Figure 5:
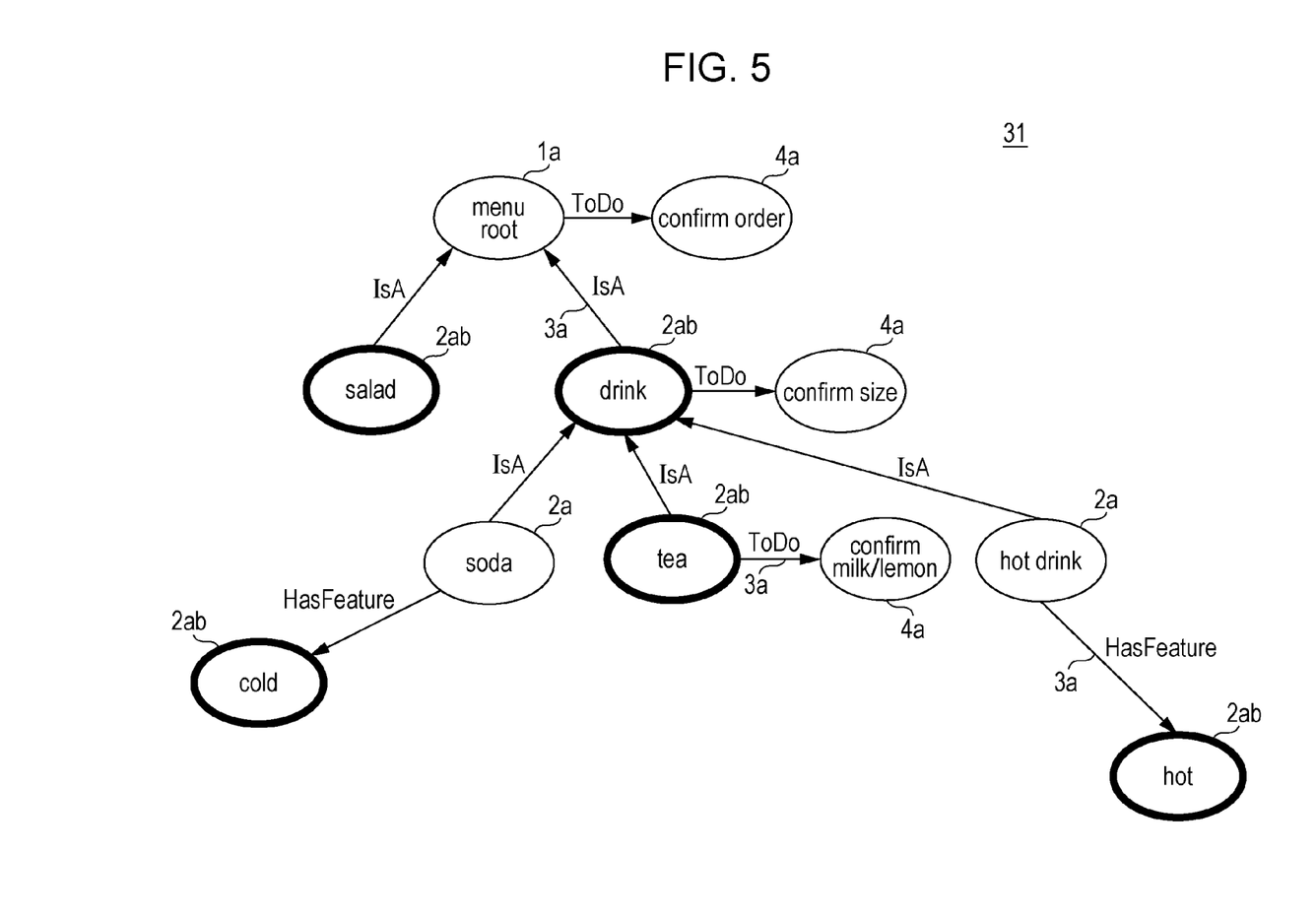
FIG. 5 is a diagram showing a specific example of a task knowledge base of the embodiment of the present disclosure.
Figure 6:
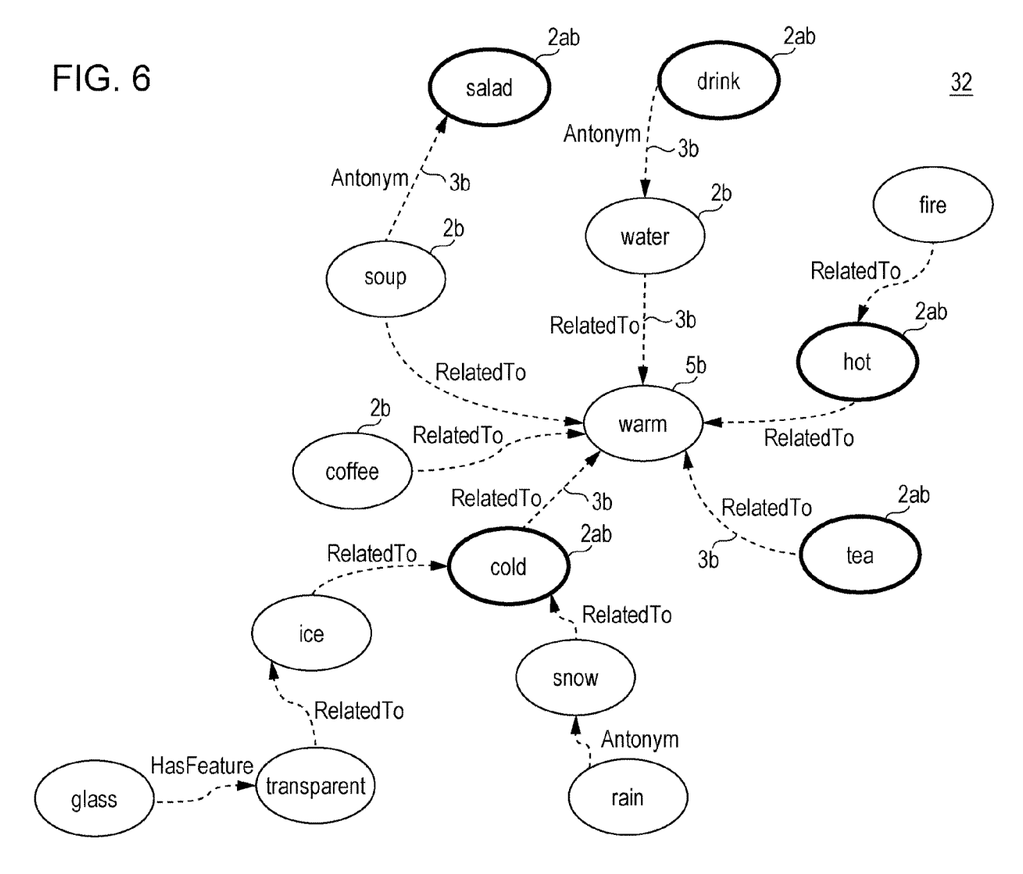
FIG. 6 is a diagram showing a specific example of a general knowledge base of the embodiment of the present disclosure.

The response sentence generation process (step S303 in FIG. 3) will be described in detail using a case where the interaction processing system 100 automatically receives an order at a restaurant. FIG. 4 shows details of the response sentence generation process (step S303 in FIG. 3). FIG. 5 shows a specific example of a part of the task knowledge base 31 when the interaction processing system 100 is a system that automatically receives orders at a restaurant. FIG. 6 shows a specific example of a part of the general knowledge base 32.

In FIG. 4, the natural language processor 22 extracts a main concept from text (input sentence) outputted from the speech recognition unit 21 or character input unit 12 (step S401). For example, when the user makes a speech "I want something warm," the natural language processor 22 analyzes the syntax of the input sentence and extracts the object "something warm." The natural language processor 22 then excludes, from the object, "something," which is typically defined as a "stop word," which is not retrieved, and extracts the remaining "warm" as a main concept.

The interaction processor 23 determines whether the extracted main concept is included in the task knowledge base 31 (S402). If the extracted main concept is included in the task knowledge base 31 (Yes in S402), the interaction processor 23 generates a response sentence for task execution (S409). As used herein, the generation of a response sentence for task execution refers to doing an action shown by an action node 4*a* associated with the main concept and a superordinate concept thereof by relatives "ToDo" in the task knowledge base 31. For example, the interaction processor 23 generates a response sentence for confirming an order, in accordance with an action node 4 "confirm order" as shown in FIG. 5. The task knowledge base 31 for automatically receiving orders as shown in FIG. 5 includes, for example, merchandize knowledge where information about various merchandise is systematized and action knowledge that describes what should be confirmed or recommended in relation to the merchandise. If the interaction processor 23 can interpret a concept included in a speech about an order made by the user using only the task knowledge base 31 and thus can complete the interaction process, it completes the interaction process using only the task knowledge base 31 and receives the order of the user.

On the other hand, if it needs to interpret a concept which is not included in the task knowledge base 31, the interaction processor 23 associates concepts in the general knowledge base 32 with concepts in the task knowledge base 31 using both the task knowledge base 31 and general knowledge base 32 and continues the interaction. Specifically, first, if the main concept is not included in the task knowledge base 31 (No in S402), the interaction processor 23 extracts a close concept from the general knowledge base 32 (step S403). For example, assume that "warm" is not included in the task knowledge base 31 shown in FIG. 5. In this case, a close concept of the main concept "warm" is extracted from the general knowledge base 32 in FIG. 6. As used herein, the term "close concept" refers to a concept whose graph distance from the main concept is a predetermined number or less (in the present embodiment, 2 or less) assuming that a concept-to-concept graph distance which can be tracked along one edge in the general knowledge base 32 is defined as "1." In an example in FIG. 6, concepts "cold," "tea," "hot," "water," "soup," and "coffee," whose graph distances from a node 5b "warm" serving as the main concept is "1," and concepts "salad," "drink," "fire," "ice," and "snow," whose graph distances therefrom are "2," are extracted as close concepts. Note that FIG. 6 shows only some of concepts associated with the main concept "warm." For example, as a whole, 10 concepts are associated with the main concept "warm" in a range whose graph distance from the main concept "warm" is "1"; 110 concepts are associated with the main concept "warm" in a range whose graph distance from the main concept "warm" is "2"; and 1110 concepts are associated with the main concept "warm" in a range whose graph distance from the main concept "warm" is "3". In this case, if concepts whose graph distances are up to "2" are extracted as close concepts, 110 concepts are extracted. The limitation of the concepts extracted from the general knowledge base 32 to concepts close to the main concept prevents the extraction of a concept having low relatedness with the inputted main concept and the generation of a response sentence based on the concept having the low relatedness. Such limitation can also reduce the amount of processing required by the interaction processes shown in FIGS. 4 and 8.

The interaction processor 23 then determines whether the extracted close concepts are included in the task knowledge base 31 (step S404). If any of the extracted close concepts are not included in the task knowledge base 31, the interaction processor 23 performs an error process (step S410). For example, the interaction processor 23 generates an error message "I do not understand" as an error process.

Figure 7:
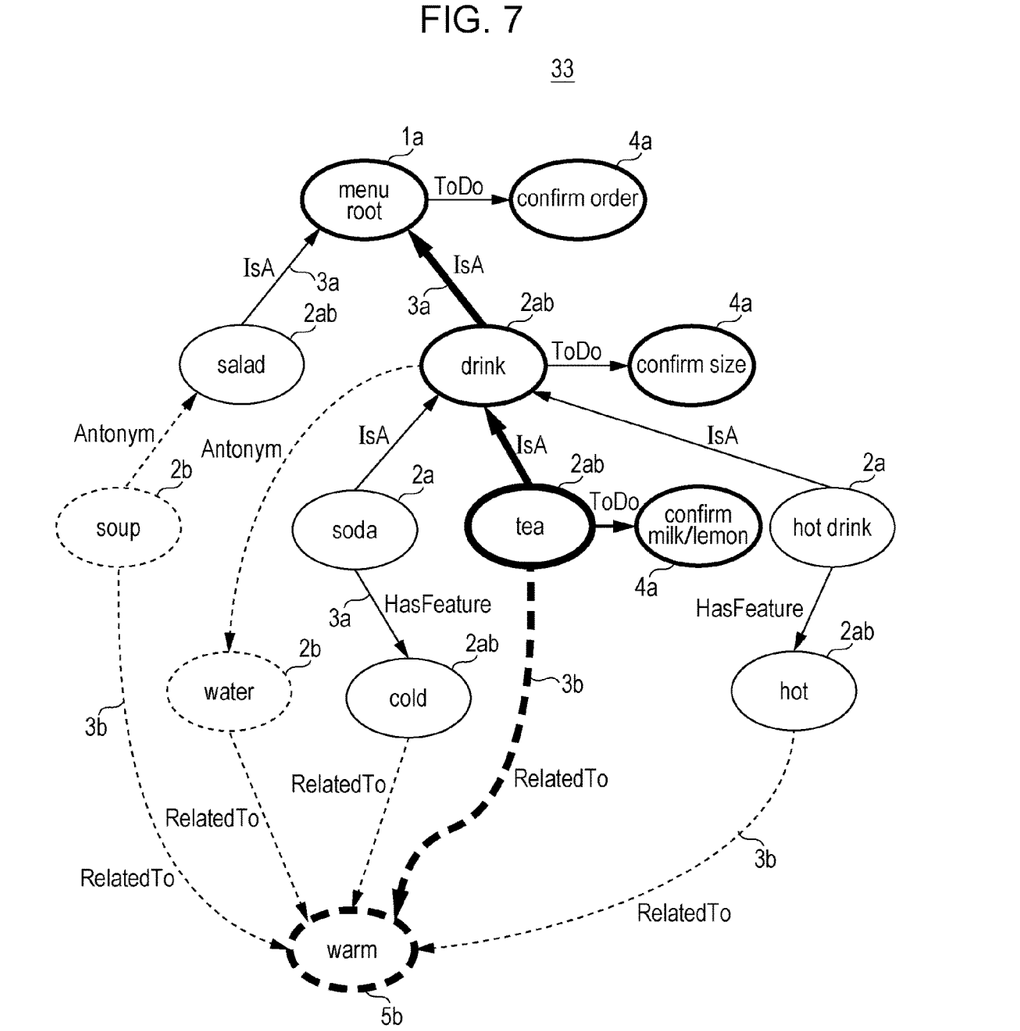
FIG. 7 is a diagram showing a specific example of combined knowledge information of the embodiment of the present disclosure.

If some of the extracted close concepts are included in the task knowledge base 31, the interaction processor 23 defines concepts included in both the general knowledge base 32 and task knowledge base 31, of such close concepts as "common concepts" and generates combined knowledge information 33 in which concepts included in the task knowledge base 31 and concepts included in the general knowledge base 32 are combined, on the basis of the common concepts (step S405). FIGS. 5 and 6 show nodes 2ab serving as common concepts using thick frames. FIG. 7 shows the combined knowledge information 33 generated on the basis of the task knowledge base 31 in FIG. 5 and the general knowledge base 32 in FIG. 6. The combined knowledge information 33 shown in FIG. 7 is knowledge information generated on the basis of common concepts "salad," "drink," "cold," "tea," and "hot." In FIG. 7, solid-line edges 3a represent edges in the task knowledge base 31, and a dotted-line edge 3b represents an edge in the general knowledge base 32. Solid-line nodes 1a, 2a, and 4a represent nodes in the task knowledge base 31, and dotted-line nodes 2b and 5b represent nodes in the general knowledge base 32. Note that of the nodes shown by the solid lines, a node 2ab connected to the dotted-line edge represents a common concept present in both the task knowledge base 31 and general knowledge base 32.

The interaction processor 23 then extracts an important related concept on the basis of the generated combined knowledge information 33 (step S406). As used herein, the term "important related concept" refers to a concept that is required to generate a response sentence and serves as an alternative to a main concept. Details of the important related concept extraction process will be described later with reference to FIG. 8. If it extracts "tea" as an important related concept in the important related concept extraction process, the interaction processor 23 performs a confirmation process with respect to the important related concept "tea" (step S407). For example, the interaction processor 23 may generate and output an inquiry sentence "We have tea. How about it?" as a confirmation process. If it obtains a confirmation (obtains a consent) on the important related concept, for example, if it receives a positive reply to the inquiry sentence about the important related concept from the user (Yes in S408), the interaction processor 23 generates a response sentence for task execution (S409). Specifically, the interaction processor 23 tracks all superordinate concepts of the important related concept "tea" along relatives "IsA" in the combined knowledge information 33, extracts all the superordinate concepts, and sequentially executes actions shown by action nodes 4a associated with the important related concept "tea" and all the superordinate concepts by relative "ToDo." For example, in FIG. 7, an action node 4a "confirm milk/lemon" for confirming whether lemon and milk are needed is associated with the important related concept "tea." For this reason, unless the histories of interaction with the user include information about whether lemon and milk are needed, the interaction processor 23 generates a response sentence for inquiring about whether lemon and milk are needed. Thus, the interaction processor 23 obtains information as to whether lemon and milk are needed, from the user. Also, an action node 4a "confirm size" for confirming the size is associated with a node "drink" serving as a superordinate concept. For this reason, unless the histories of interaction with the user include information about the size, the interaction processor 23 generates a response sentence for inquiring about the size. Thus, the interaction processor 23 obtains information about the size from the user. Further, the interaction processor 23 performs a final confirmation process about the order on the basis of an action node 4a "confirm order" associated with a root node 1a "menu root." For example, the interaction processor 23 may inquire of the user about whether there is no other order. If it fails to obtain a confirmation (or fails to obtain a consent) on the important related concept from the user, for example, if it receives a negative replay from the user (No in S408), the interaction processor 23 performs an error process such as the generation of an error message (step S410). Note that if it receives a negative replay on the important related concept from the user (No in S408), the interaction processor 23 may perform a confirmation process with respect to any other potential important related concept, which has not been selected as an important related concept.

Figure 8:
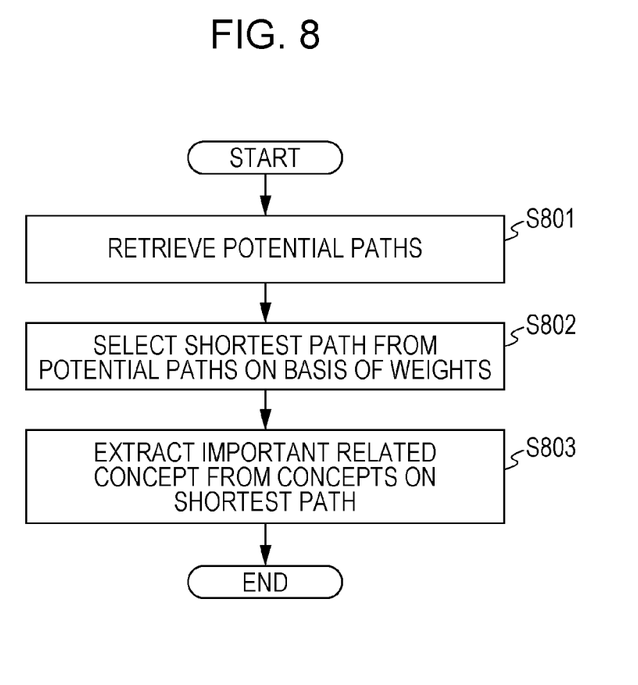
FIG. 8 is a flowchart showing details of a process in step S406 of FIG. 4.

FIG. 8 shows details of the important related concept extraction process (step S406 in FIG. 4). The interaction processor 23 retrieves all paths from the node 5b "warm" serving as a main concept to the root node 1a "menu root" of the task knowledge base 31 in the combined knowledge information 33 as shown in FIG. 7 (step S801). The retrieved paths serve as potential paths for retrieving the important related concept.

Specifically, paths from the node 5b "warm" serving as a main concept to the root node 1a "menu root" through the nodes 2ab "salad," "drink," "cold," "tea," and "hot" serving as close concepts are retrieved. For example, paths such as a path through "warm"-"soup"-"salad"-"menu root," a path through "warm"-"water"-"drink"-"menu root," and a path through "warm"-"tea"-"drink"-"menu root" are retrieved as potential paths.

Then, the interaction processor 23 selects the shortest path from among the paths retrieved as potential paths (S802). In the present embodiment, weights are previously assigned to the relatives with respect to the relatedness between concepts. The interaction processor 23 calculates the sum of the weights for each of the paths from the node 5b serving as a main concept to the root node 1a and selects one of the paths on the basis of the sizes of the sums. For example, smaller weights are assigned to relatives whose concepts have closer relatedness. Specifically, 0.5, 1.0, 3.0, and 10.0 are assigned to relatives IsA, HasFeature, RelatedTo, and Antonym, respectively. In this case, the weighted distances of the paths shown in FIG. 7, a path through "tea," a path through "hot," a path through "cold," a path through "water," and a path through "soup," become 4.0, 5.0, 5.0, 13.5, and 13.5, respectively. The interaction processor 23 selects a path where concepts have the closest relatedness, that is, a path whose weighted distance is the smallest. In this case, the shortest distance is a path through "tea." FIG. 7 shows the shortest path using a thick line. For example, the Dijkstra method (Dijkstra algorithm) may be used to obtain the shortest path. As seen above, the paths are weighted in accordance with the relatives. Thus, ranks can be given to the paths on the basis of a comparison among the values. As a result, for example, the need to make a rule for giving ranks about importance to various combinations of the relatives on the paths is eliminated.

Then, the interaction processor 23 extracts one of the concepts on the shortest path as an important related concept (step S803). Specifically, the interaction processor 23 extracts, as the important related concept of the main concept, the most subordinate one of the concepts that are on the shortest path and can be tracked from the root node 1a along relatives "IsA" in the task knowledge base 31. This is because a more subordinate concept is more specific and is closer to the main concept. In an example in FIG. 7, the shortest path includes concepts "menu root," "drink," "tea," and "warm." Among these, "tea," which is present in the task knowledge base 31 and is the most superordinate one of the concepts which can be tracked from the root node 1a along only relatives "IsA," is extracted as an important related concept of the main concept "warm."

By extracting the important related concept in this manner, the interaction processor 23 can reply to the user's request "I want something warm" with a response sentence "We have tea. How about it?" (step S407 in FIG. 4).

3. Advantageous Effects and the Like

To generate a task knowledge base 31 such that tasks are executed without errors, it is necessary to generate it while scrutinizing it manually. For this reason, typically, a task knowledge base 31 is more likely to be generated in small size, and such a task knowledge base 31 is more likely not to include concepts in a speech of the user. On the other hand, a general knowledge base 32 is generated by mechanically extracting knowledge from a great amount of text data under a rule and therefore a large-side knowledge base can be obtained. However, such a general knowledge base 32 is not directly associated with actions and therefore is more likely not to include knowledge required to execute tasks. Also, a general knowledge base 32 has a large size and includes an enormous number of knowledge combinations and therefore it is difficult to retrieve knowledge required to execute a task in such a general knowledge base 32.

The interaction processing system 100 of the present embodiment is able to process even concepts that cannot be processed using only the task knowledge base 31, by using both the task knowledge base 31, which includes knowledge related to execution of tasks, and the general knowledge base 32, which covers a wide range of general concepts. Specifically, the interaction processing system 100 generates combined knowledge information 33 about a main concept extracted from an input sentence on the basis of common concepts included in both the general knowledge base 32 and task knowledge base 31; retrieves paths from the node 5b serving as a main concept in the general knowledge base 32 to the root node 1a in the task knowledge base 31 in the combined knowledge information 33; and extracts an important related concept from the retrieved paths and thus determines a response sentence leading to the achievement of the task. Thus, the interaction processing system 100 is able to continue to interact with the user with high response ability toward the achievement of the task, even if the request is not included in the task knowledge base 31. As seen above, according to the present embodiment, the use of both the task knowledge base 31 and general knowledge base 32 allows a wider range of concepts to be covered and thus allows a task to be more reliably executed.

In the present embodiment, the shortest path is selected using the weights of the relatives (S802 in FIG. 8). If paths having the shortest graph distance (that is, paths having the smallest number of edges) are defined as the shortest paths, a path through "soup," a path through "water," and a path through "tea," whose graph distances are 3 in FIG. 7, are selected as the shortest paths. However, the path through "soup" includes "salad." If "salad" is extracted as an important related concept, the interaction processing system 100 would inappropriately reply to the user's request "I want something warm" with a response sentence "We have salad. How about it?" This is because "soup" and "salad" on the path are associated with each other by a relative "Antonym" (antonym). Accordingly, it is preferred to make a path including a relative "Antonym" (antonym) less likely to be selected as the shortest path. According to the present embodiment, smaller weights are assigned to relatives whose concepts have closer relatedness and thus a path having a distance having the smallest weight is selected. Thus, an unfavorable important related concept can be made less likely to be extracted.

Figure 9:
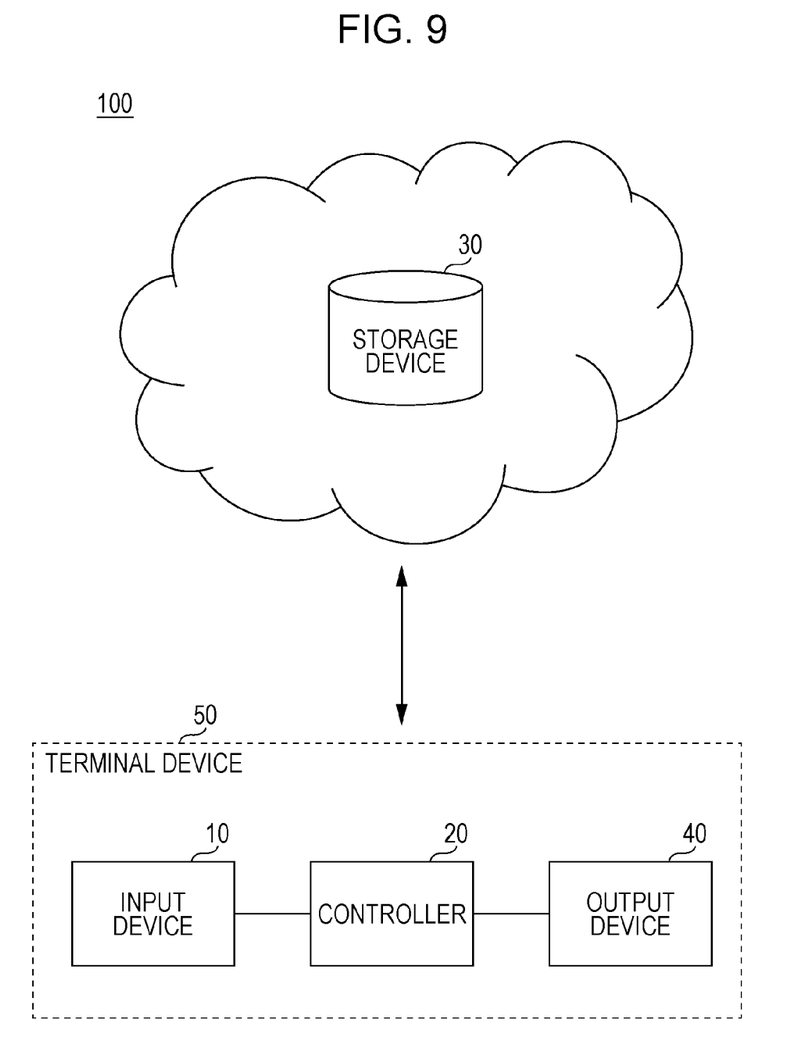
FIG. 9 is a diagram showing an implementation example where the interaction processing system of the present disclosure is realized using the cloud (network)
Figure 10:
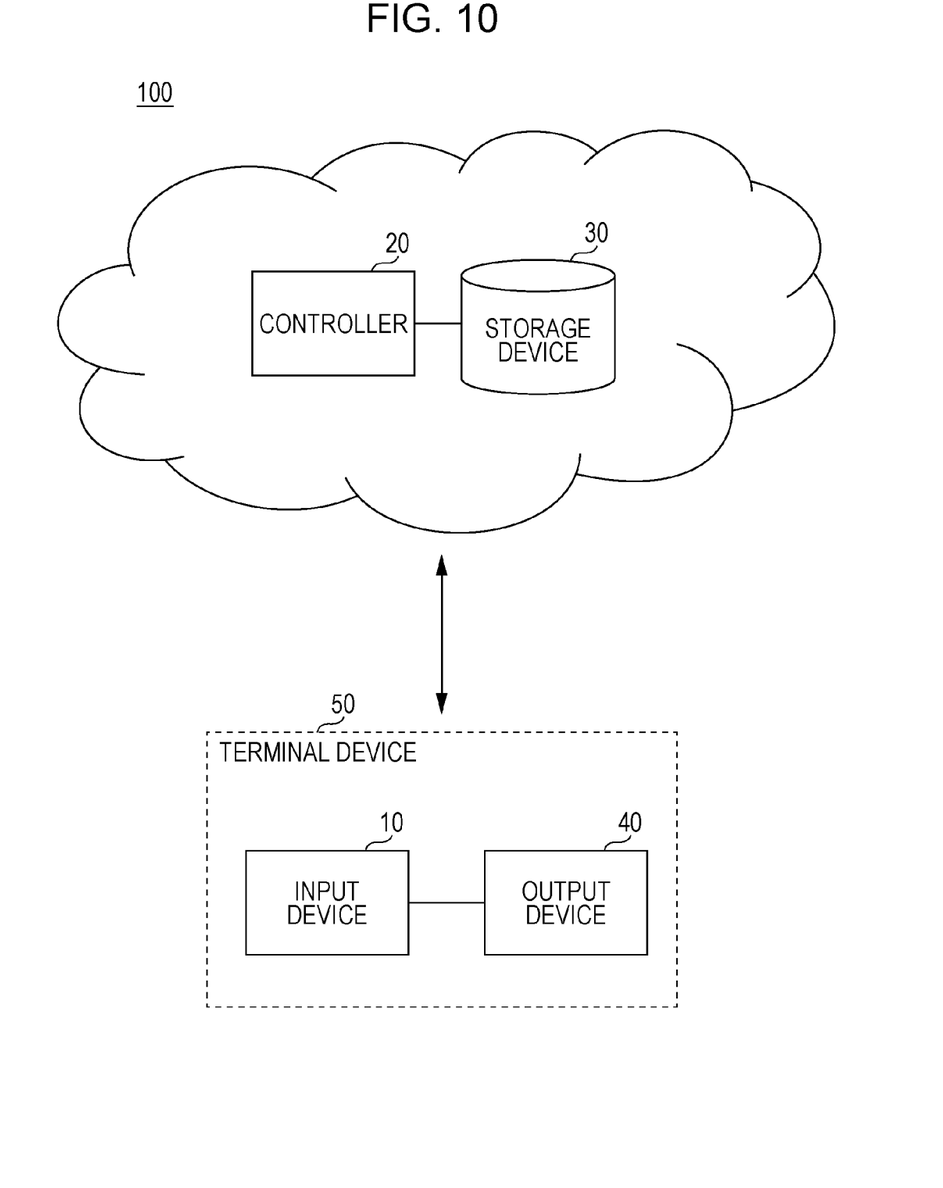
FIG. 10 is a diagram showing another implementation example where the interaction processing system of the present disclosure is realized using the cloud (network).

Note that some functions of the interaction processing system 100 may be realized on the cloud. For example, FIG. 9 shows an example of a configuration where a storage unit 30 (knowledge base server) that manages knowledge bases 31, 32 is provided on the cloud. As shown in FIG. 9, the storage unit 30 may be provided on a network, and a terminal device 50 may include only an input unit 10, a controller 20, and an output unit 40 of an interaction processing system 100. The controller 20 of the terminal device 50 accesses the storage unit 30, that is, the knowledge bases 31, 32 on the cloud. FIG. 10 shows an example of a configuration where a controller 20 and a storage unit 30 are provided on the cloud. As shown in FIG. 10, the controller 20 and storage unit 30 may be provided on a network, and a terminal device 50 may include only an input unit 10 and an output unit 40 of an interaction processing system 100. The terminal device 50 transmits a speech signal or text information indicating an input sentence to the controller 20 on the cloud. The controller 20 generates a response sentence on the basis of the speech signal or text information received from the terminal device 50 and sends a speech signal or text corresponding to the response sentence back to the terminal device 50.

While the case in which the controller 20 is a server has been described in the above embodiment, the controller 20 may be a general-purpose personal computer or mobile terminal (smartphone, etc.). For example, if the controller 20 is a mobile terminal, the memory 24 is a built-in storage such as a flash memory.

Present Disclosure

The following configurations are disclosed in the above embodiment.

(1) A processing method of one general aspect of the present disclosure is a processing method used by a processor that automatically receives an order from a user at a restaurant through an interaction with the user. The processing method includes analyzing specific order information indicating the order of the user inputted through a microphone connected to the processor or a keyboard connected to the processor or a touchscreen connected to the processor, extracting, from the specific order information, a phrase other than a standard element commonly used in orders at the restaurant, with reference to a first database in which multiple phrases and multiple confirmation items with respect to the order are associated with each other when it is determined that the extracted phrase is a first phrase included in the first database, outputting first confirmation information corresponding to a first confirmation item indicating the first phrase to the user through a speaker connected to the processor or a display connected to the processor, the phrase including a noun and a noun phrase, receiving first response information indicating a first response from the user corresponding to the first confirmation item through the microphone or the keyboard or the touchscreen, when it is determined that the extracted phrase is not a first phrase included in the first database, referring to a second database in which multiple phrases and one or more phrases related to the phrases are associated with each other, the phrases and the related one or more phrases included in the second database including a noun, an adjective, and an adjective phrase, when it is determined that the extracted phrase is a second phrase included in the second database, selecting a third phrase commonly included in the first database from among one or more phrases related to the second phrase, the third phrase number including a noun and a noun phrase, outputting second confirmation information indicating a second confirmation item corresponding to the third phrase to the user through the speaker or the display with reference to the first database, receiving second response information indicating a second response from the user corresponding to the second confirmation item through the microphone or the keyboard or the touchscreen, and continuing a process of receiving an order from the user.

As seen above, by using both the task knowledge base and general knowledge base, it is possible to process even input concepts that cannot be processed using only the task knowledge base and to continue to interact with the user with high response ability. As a result, the task can be executed.

(2) The processing method of the above aspect may further include after receiving the first response information indicating the first response from the user corresponding to the first confirmation item, outputting third confirmation information indicating a third confirmation item, specified with reference to the first database, corresponding to a fourth phrase indicating a superordinate concept of the first phrase to the user through the speaker or the display, receiving third response information indicating a third response from the user corresponding to the third confirmation item through the microphone or the keyboard or the touchscreen, and completing the process of receiving the order of the user.

(3) In the processing method of the above aspect, the first database may store a fifth phrase indicating a coordinate concept of the third phrase, a sixth phrase indicating a superordinate concept of the third phrase and the fifth phrase, a first weighting factor indicating relatedness between the third phrase and the sixth phrase, and a second weighting factor indicating relatedness between the third phrase and the sixth phrase. The one or more phrases related to the second phrase may include the second phrase and the fifth phrase. The second database may store a third weighting factor indicating the relatedness between the second phrase and the third phrase and a fourth weighting factor indicating relatedness between the second phrase and the fifth phrase. When a first sum of the first weighting factor and the third weighting factor is smaller than a second sum of the second weighting factor and the fourth weighting factor, the third phrase may be selected.

Since the shortest path includes a concept having high relatedness with the input concept, it is possible to generate a response sentence using the concept having high relatedness with the input concept.

(4) In the processing method of the above aspect, when it is determined that the extracted phrase is not included in the second database, an error message may be outputted to the user through the speaker or the display.

(5) In the processing method of the above aspect, the plurality of confirmation items may include a proposal related to the order.

(6) A processing system of another aspect of the present disclosure is a processing system for automatically receiving an order from a user at a restaurant through an interaction with the user. The processing system includes a processor, a microphone, a keyboard, a touchscreen, a display, and a speaker. The processor analyzes specific order information indicating the order of the user inputted through the microphone, the keyboard, or the touchscreen, extracts, from the specific order information, a phrase other than a standard element commonly used in orders at the restaurant, with reference to a first database in which multiple phrases and multiple confirmation items with respect to orders are associated with each other and, when the processor determines that the extracted phrase is a first phrase included in the first database, outputs first confirmation information indicating a first confirmation item corresponding to the first phrase to the user through a speaker connected to the processor or a display connected to the processor, the phrase including a noun and a noun phrase, receives first response information indicating a first response from the user corresponding to the first confirmation item through the microphone or the keyboard or the touchscreen, when the processor determines that the extracted phrase is not included in the first database, with reference to the first database, refers to a second database in which multiple phrases and one or more phrases related to the phrases are associated with each other, the phrases and the related one or more phrases included in the second database including a noun, a noun phrase, an adjective, and an adjective phrase, when the processor determines that the extracted phrase is a second phrase included in the second database, selects a third phrase included in the first database from among one or more phrases related to the second phrase, the third phrase number including a noun and a noun phrase, outputs second confirmation information indicating a second confirmation item corresponding to the third phrase to the user through the speaker or the display with reference to the first database, receives second response information indicating a second response from the user corresponding to the second confirmation item through the microphone or the keyboard or the touchscreen, and continues a process of receiving the order of the user.

(7) A non-transitory storage medium of yet another aspect of the present disclosure may store a program for causing a processor to execute the processing method described in (1).

The interaction processing method and interaction processing system set forth in Claims of the present disclosure are realized, for example, by a collaboration between hardware resources, such as a processor and memory, and a program.

The interaction processing method and interaction processing system of the present disclosure are able to generate a response sentence with high response ability and therefore are useful as interaction processing means that automatically interact with the user.

What is claimed is:

1. A processing method executed by a processor that automatically receives an order from a user at a restaurant through an interaction with the user, the processing method comprising:
    analyzing specific order information indicating the order of the user inputted through a microphone connected to the processor or a keyboard connected to the processor or a touchscreen connected to the processor;
    extracting, from the specific order information, a phrase other than a standard element commonly used in orders at the restaurant;
    with reference to a first database in which a plurality of phrases and a plurality of confirmation items with respect to orders are associated with each other when it is determined that the extracted phrase is a first phrase included in the first database, outputting first confirmation information indicating a first confirmation item corresponding to the first phrase to the user through a speaker connected to the processor or a display connected to the processor, the phrase including a noun and a noun phrase;
    receiving first response information indicating a first response from the user corresponding to the first confirmation item through the microphone or the keyboard or the touchscreen;
    when it is determined that the extracted phrase is not included in the first database, with reference to the first database, referring to a second database in which a plurality of phrases and one or more phrases related to the plurality of phrases are associated with each other, the plurality of phrases and the related one or more phrases included in the second database including a noun, a noun phrase, an adjective, and an adjective phrase;
    when it is determined that the extracted phrase is a second phrase included in the second database, selecting a third phrase included in the first database from among one or more phrases related to the second phrase, the third phrase including a noun and a noun phrase;
    outputting second confirmation information indicating a second confirmation item corresponding to the third phrase to the user through the speaker or the display with reference to the first database;
    receiving second response information indicating a second response from the user corresponding to the second confirmation item through the microphone or the keyboard or the touchscreen; and
    continuing a process of receiving the order of the user.

2. The processing method of claim 1, further comprising:
    after receiving the first response information indicating the first response from the user corresponding to the first confirmation item, outputting third confirmation information indicating a third confirmation item corresponding to a fourth phrase, specified with reference to the first database, indicating a superordinate concept of the first phrase to the user through the speaker or the display;
    receiving third response information indicating a third response from the user corresponding to the third confirmation item through the microphone or the keyboard or the touchscreen; and
    completing the process of receiving the order of the user.

3. The processing method of claim 1,
    wherein the first database stores a fifth phrase indicating a coordinate concept of the third phrase, a sixth phrase indicating a superordinate concept of the third phrase and the fifth phrase, a first weighting factor indicating relatedness between the third phrase and the sixth phrase, and a second weighting factor indicating relatedness between the third phrase and the sixth phrase,
    the one or more phrases related to the second phrase include the second phrase and the fifth phrase,
    the second database stores a third weighting factor indicating the relatedness between the second phrase and the third phrase and a fourth weighting factor indicating relatedness between the second phrase and the fifth phrase, and
    when a first sum of the first weighting factor and the third weighting factor is smaller than a second sum of the second weighting factor and the fourth weighting factor, the third phrase is selected.

4. The processing method of claim 1,
    wherein when it is determined that the extracted phrase is not included in the second database, an error message is outputted to the user through the speaker or the display.

5. The processing method of claim 1,
    wherein the plurality of confirmation items include a proposal related to the order.

6. A processing system for automatically receiving an order from a user at a restaurant through an interaction with the user, the processing system comprising:
    a processor;
    a microphone;
    a keyboard;
    a touchscreen;
    a display; and
    a speaker,
    wherein the processor analyzes specific order information indicating the order of the user inputted through the microphone, the keyboard, or the touchscreen; extracts, from the specific order information, a phrase other than a standard element commonly used in orders at the restaurant; with reference to a first database in which a plurality of phrases and a plurality of confirmation items with respect to orders are associated with each other when the processor determines that the extracted phrase is a first phrase included in the first database, outputs first confirmation information indicating a first confirmation item corresponding to the first phrase to the user through the speaker or the display, the phrase including a noun and a noun phrase; receives first response information indicating a first response from the user corresponding to the first confirmation item through the microphone or the keyboard or the touchscreen; when the processor determines that the extracted phrase is not included in the first database, with reference to the first database, refers to a second database in which a plurality of phrases and one or more phrases related to the plurality of phrases are associated with each other, the plurality of phrases and the related one or more phrases included in the second database including a noun, a noun phrase, an adjective, and an adjective phrase; when the processor determines that the extracted phrase is a second phrase included in the second database, selects a third phrase included in the first database from among one or more phrases related to the second phrase, the third phrase including a noun and a noun phrase; outputs second confirmation information indicating a second confirmation item corresponding to the third phrase to the user through the speaker or the display with reference to the first database; receives second response information indicating a second response from the user corresponding to the second confirmation item through the microphone or the keyboard or the touchscreen; and continues a process of receiving the order of the user.

7. A non-transitory storage medium storing a program for causing a processor to execute the processing method of claim 1.

\* \* \* \* \*